United States Patent [19]

Sarmiento

[11] 4,273,211
[45] Jun. 16, 1981

[54] FIXED PIVOT SINGLE PEDAL ACCELERATOR AND BRAKE CONTROL MECHANISM

[76] Inventor: Alberto G. Sarmiento, Box 305, Mayaguez, P.R. 00708

[21] Appl. No.: 27,688

[22] Filed: Apr. 6, 1979

Related U.S. Application Data

[63] Continuation of Ser. No. 824,813, Aug. 15, 1977, abandoned.

[51] Int. Cl.³ .............................................. B60K 26/02
[52] U.S. Cl. ...................................... 180/333; 74/478; 74/513; 192/35
[58] Field of Search ............. 180/333; 74/478, 471 R, 74/513, 512; 192/35

[56] References Cited

U.S. PATENT DOCUMENTS

| | | | |
|---|---|---|---|
| 1,103,094 | 7/1914 | Staples | 74/513 |
| 1,176,784 | 3/1916 | Speiden | 74/478 |
| 1,330,986 | 2/1920 | Rice | 74/513 |
| 1,632,940 | 6/1927 | Wright | 74/513 |
| 2,162,183 | 6/1939 | Smith | 192/35 |
| 2,194,198 | 3/1940 | Millican | 192/35 |
| 2,196,125 | 4/1940 | Smith | 192/35 |
| 2,483,224 | 9/1949 | Narcovich | 74/478 |
| 2,883,014 | 4/1959 | Watson | 192/35 |

Primary Examiner—John P. Silverstrim
Attorney, Agent, or Firm—Gustave Miller

[57] ABSTRACT

This is a combination accelerator and brake control mechanism wherein there is a single pedal serving both as the gas control and the brake control. The single pedal is pivoted on a pivot fixed in a base, the pedal extending through the vehicle floor board. Pressing with the foot on the superior or upper part of the single pedal controls the gas to the vehicle motor, pressing with the foot on the lower or inferior part of the pedal controls the brakes of the vehicle. A see-saw rod contacts directly or indirectly with the ends of both the vehicle gas control rod or the brake control rod, and the motion of the pedal pressed down on its top end acting through the see-saw rod moves the gas control rod from neutral position to gas control position, and pressing the lower end of the pedal actuates the brake control rod. Thus, the action of the human foot with this device is very similar to that with the customary two pedal control, for the usual accelerator is usually operated by toe pressure and the brake pedal is usually operated by heel pressure.

5 Claims, 8 Drawing Figures

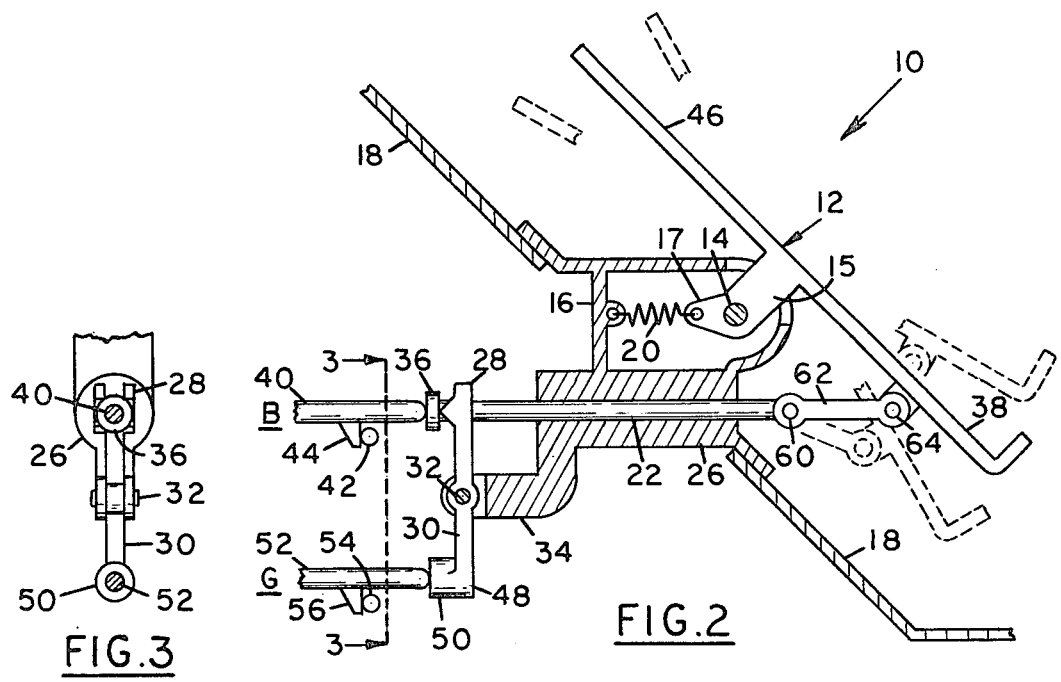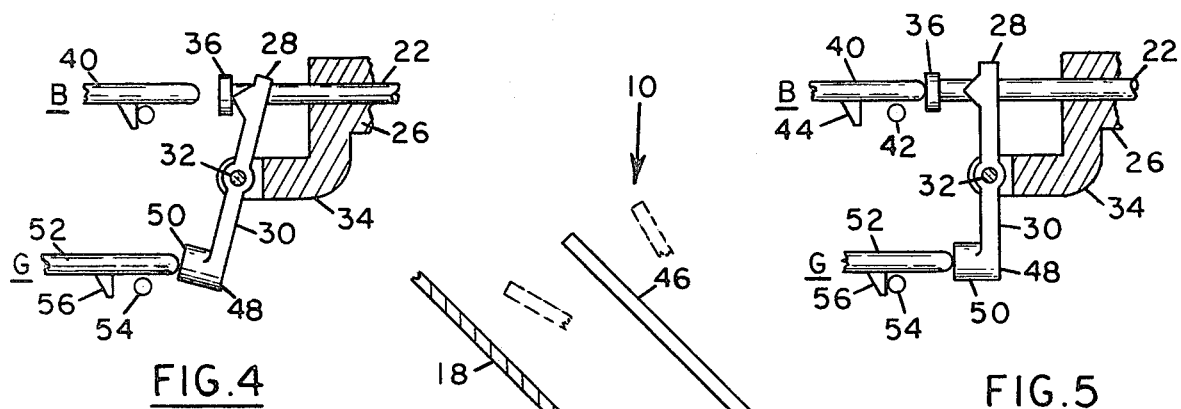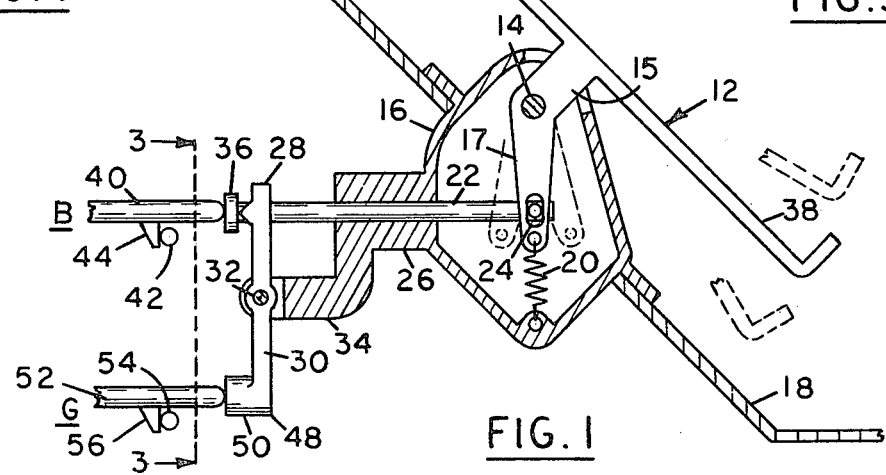

FIXED PIVOT SINGLE PEDAL ACCELERATOR AND BRAKE CONTROL MECHANISM

This is a continuation of application Ser. No. 824,813, filed Aug. 15, 1977, now abandoned.

OBJECTS OF THIS INVENTION

It is an object of this invention to provide an improved combination single accelerator and brake pedal wherein toe pressure actuates the gas control rod of the vehicle, while heel pressure operates the brake control rod of the vehicle, thus greatly resembling the usual action of the foot, except it remains on the single pedal instead of having to move from one pedal to the other. This facilitates quick emergency operation of the brake when necessary by avoiding losing time for shifting of the operating foot from a gas to a brake pedal.

A further object of this invention is to provide a single pedal pivoted on a fixed pivot within a base secured to the vehicle floor, with the single pedal extending above the vehicle floor.

A further object of this invention is to provide a see-saw actuating rod which is controlled by the single pedal to transmit pushing action selectively on either the vehicle brake control rod or the vehicle gas control rod, the control rod not being pushed returning to and remaining in neutral position.

Yet a further object of this invention is to provide a variety of possible operating means between the single pedal and the gas and brake control rods of the vehicle.

A further object of this invention is to provide a single pedal for selectively controlling the gas food or the brake operation that is an improvement over the prior art patents, as U.S. Pat. Nos. 2,112,019, 2,242,145, 2,281,755, 2,332,122, 2,792,092, 2,919,773, 3,006,445, 1,994,699 and others.

BRIEF DESCRIPTION OF THE FIGURES

With the foregoing and related objects in view, this invention consists in the details of construction and combination of parts as will be more fully understood from the following description when read in conjunction with the accompanying drawings, in which:

FIG. 1 is a partly sectional, partly elevational view of one form of this combination accelerator and brake single pedal control mechanism.

FIG. 2 is a similar view of another form of this invention.

FIG. 3 is a section, on lines 3—3 of FIGS. 1, 2 and 6.

FIG. 4 shows the see-saw rod providing gas or accelerator action as the upper or superior portion of the single pedal is pushed.

FIG. 5 shows the see-saw rod providing brake action as the inferior or lower portion of the single pedal is pushed.

Figure 6:
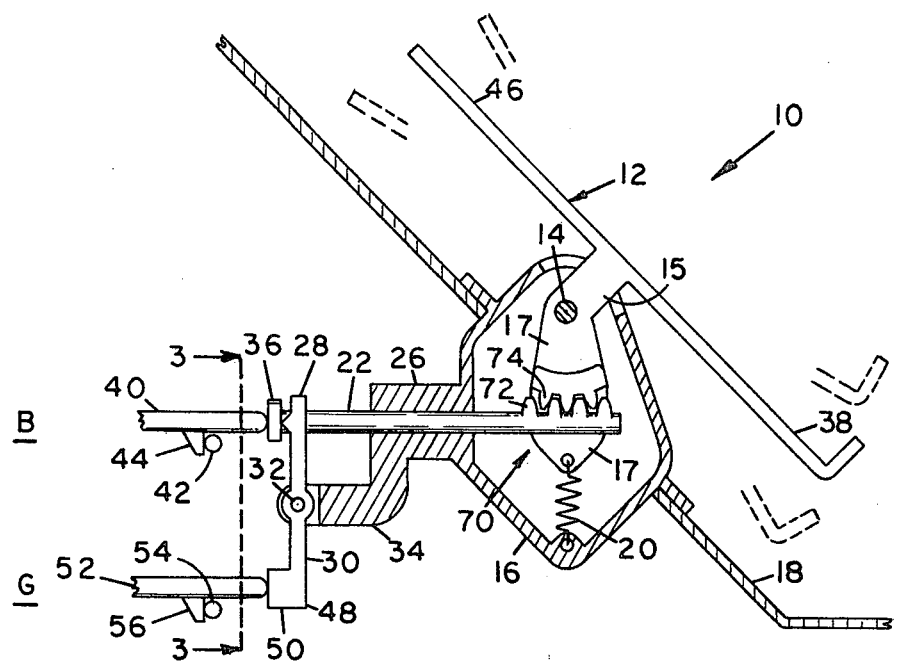
FIG. 6 is a view similar to FIGS. 1 and 2, showing still another form of this invention.

There is shown at 10 one form of the fixed pivot single pedal accelerator and brake control mechanism of this invention for a vehicle using an internal combustion engine. This comprises a single pedal 12 having a see-saw pivotal movement on its pivot arm 15, the arm 15 being pivoted on a pivot 14 fixedly mounted in a base 16, the pedal 12 extending above the vehicle floor 18 and the base 16 being supported on and through the floor 18. A spring 20 secured between an extension 17 of the pivot arm 15 and the base 16 returns the pivot arm 15 and the pedal 12 to neutral position when pedal 12 is relieved of human foot pressure.

A bar 22 is movably connected at one end by a pin and slot connection 24 to pedal 12 in FIG. 1, to slide back or forth through a boss 26 extending from base 16. At its other end, the bar 22 extends through a fork 28 at one end of see-saw rod 30 pivoted at 32 to a right angle extension 34 depending from boss 26. Beyond the fork 28, the bar 22 terminates in an enlarged foot 36. When the pedal 12 has its lower or inferior portion 38 pressed down by the human foot, the bar foot 36 abuts the end of brake control rod 40 to actuate the vehicle brake mechanism in the usual manner.

A stop 42 fixed in the path of a finger 44 extending from a side of brake control rod 40 permits the brake control rod 40 to be moved freely toward brake actuating position, but restrains its movement back beyond the neutral position when pressure is removed from the abutting end of the brake control rod 40. When human foot pressure is applied to the upper or superior portion 46 of the pedal 12, the bar foot 36 acts as a hook to pull the forked end 28 away from brake rod contacting position and against see-saw rod 30 about its pivot 32 to cause its lower end 48 and enlarged foot 50 to abut and press against the gas control rod 52 to actuate the vehicle carburetor in the usual manner to feed gas to the engine. A stop 54 in the path of finger 56 on gas control rod 52 permits the gas rod 52 to move freely in gas feeding direction, but to return only to neutral position.

Thus, see-saw action on the pedal 12 acts to operate either the brake control rod 40 or the gas control rod 52, while the other control rod remains in neutral position, and when human foot pressure is relieved, both brake and gas control rods 40 and 52 remain in neutral position.

In the other forms of carrying out this invention, the same reference numbers are used for idential parts having identical functions, and are not repeated, to avoid encumbering the disclosure.

In FIG. 2, the bar 22 is pivotally connected at 60 to a link 62 which in turn is pivoted at 64 to the bottom of the lower or inferior portion 38 of its pedal 22. See-saw rod action of this pedal 12 in FIG. 2 provides the see-saw action to see-saw rod 30, thus controlling the gas or brake control rods 52 or 40.

In FIG. 6, another form of this invention is disclosed, differing from that of FIG. 1 only by providing a rack and gear connection 70 between pedal arm extension 17 and bar 22. Rack teeth 72 on bar 22 mesh with gear teeth 74 on bar 22, and the remaining structure and function is identical with that of FIGS. 1 and 2.

Figures 7, 8:
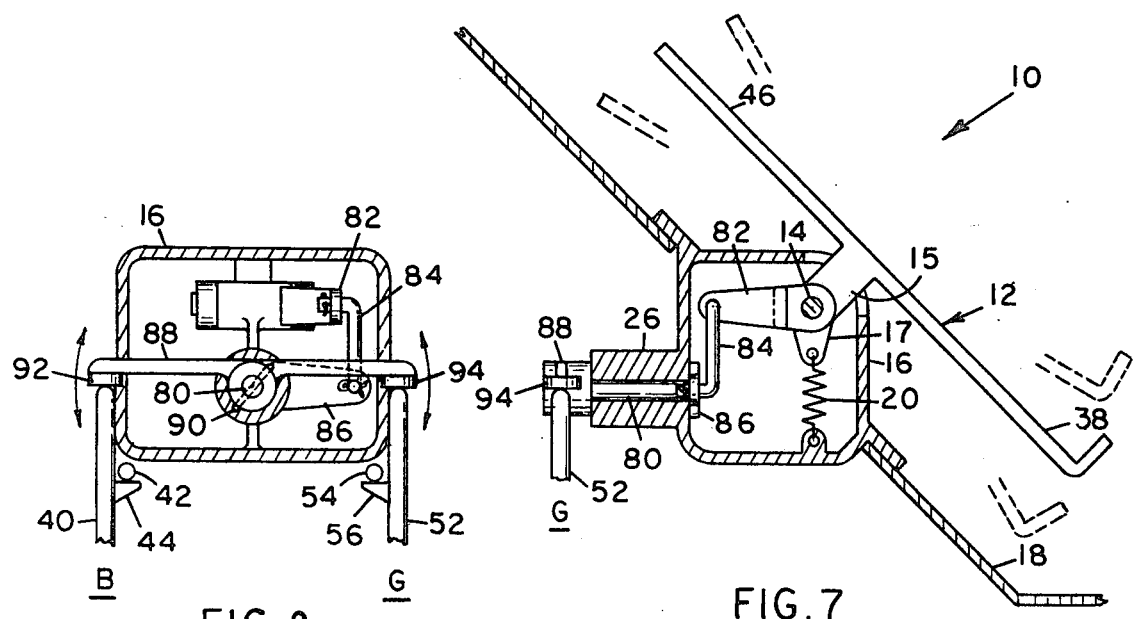
FIG. 7 is a view similar to FIGS. 1, 2 and 6 showing a further form of this invention.
FIG. 8 is a sectional view at right angles to FIG. 7 showing its operation.

In FIGS. 7 and 8, bar 80 is journaled through the base boss 26. A crank arm 82, fixedly secured to pedal arm 15, is pivotally connected to a link 84 which in turn is pivotally connected to a crank arm 86 affixed on the inner end of journaled bar 80 within base 16. Outside its base 16, the journaled bar 80 has a see-saw rod 88 pinned to it at 90. An enlarged foot 92 at one end of see-saw rod 88 actuates its brake control rod 40 from neutral position to braking position, and see-saw rod foot 94 actuates its gas control rod 52 from a neutral position to gas feeding position corresponding to the see-saw movement of its pedal 12.

ABSTRACT OF THE DRAWINGS

In the drawings, like numbers refer to like parts, and for the purposes of explication, set forth below are the numbered parts of the fixed pivot single pedal accelerator and brake control mechanism:

10 all forms of the invention
12 combination brake and accelerator pedal
14 fixed pivot of 12
15 pedal arm
16 base
17 extension of 15 beyond its pivot 14
18 vehicle floor
20 spring urging control mechanism to neutral position
22 reciprocablebar actuated by 12
24 pin and slot connection of 22 to 17
26 boss on base 16
28 fork at end of 30
30 see-saw rod
32 pivot of 30
34 right angle extension of boss 26
36 enlarged foot on bar 22
38 inferior portion of pedal 12
40 or B brake control rod
42 stop, in path of brake rod finger 44
44 brake rod finger
46 superior or upper portion of pedal 12
48 lower or gas control end of 30
50 foot on 48
52 or G vehicle gas control rod
54 stop for 56
56 finger on 52

In FIG. 2:
60 pivot connection of bar 22 to link 62
62 link
64 pivot of 62 to bottom of 12

In FIG. 6
70 rack and gear connection of 22 to 17
72 rack teeth on bar 22
74 gear teeth on extension arm 17

In FIGS. 7 and 8:
80 journaled bar (instead of 22)
82 crank arm fixed to 15
84 link pivoted at each end, to 82 and 86
86 crank arm fixed on 80 inside 16
88 see-saw rod fixed on 80 outside of base 16
90 pin fixing 88 on 80
92 brake control rod abutting foot on 88
94 gas control rod abutting foot on 88

Although this invention and some of its forms have been described in considerable detail, such description is intended as being illustrative rather than limiting, since the invention may be variously embodied, and the scope of the invention is to be determined as claimed.

Having thus set forth and disclosed the nature of this invention, what is claimed is:

1. In a vehicle having an accelerator control rod and a brake control rod extending generally parallel to each other and trasversely spaced and terminating freely at one end, a fixed pivot single pedal accelerator and brake control mechanism comprising a pivot base secured to the floor of said motor behicle, a pedal pivot fixedly mounted on said base, a combined accelerator and brake control pedal provided with a depending pivot arm intermediate its ends, pivotally mounted on said pedal pivot said pedal having an upper portion extending to one side of said pivot and also having a lower portion extending to the other side of said pivot, said pivot arm having an extension extending beyond said pedal pivot, a bar slidably mounted through a bore in said base, said pedal pivot arm extension being operatively connected to one end of said slidably mounted bar, a see-saw rod having one bifurcated end and pivotally mounted intermediate its ends on an extension of said base and spaced from one end of said bore, said slidably mounted rod extending through said bifurcated end of said see-saw rod and terminating in an enlarged foot in alignment with the brake control rod for brake operation only when the lower portion of said pedal is depressed, said enlarged foot providing a hook pulling the bifurcated end of said see-saw rod to rock about its pivot to actuate its other end against the accelerator control rod to actuate same only when the upper portion of said pedal is depressed.

2. The mechanism of claim 1, and means limiting the movement of said brake control rod and gas control rod comprising a finger affixed to each said control rod and a stop member fixed in the path of such said control rod finger limiting the movement of each said control rod from actuating to non-actuating position only.

3. The mechanism of claim 2, and yieldable means secured to a portion of said base and to said pedal arm extension urging said pedal to non-actuating position when relieved of human foot pressure.

4. The mechanism of claim 3, said pedal arm extension and said slidable bar having a pin and slot connection.

5. The mechanisms of claim 3, and a gear and rack means connecting said slidable bar to said pedal arm for actuating said see-saw rod comprising a toothed gear on said pedal arm meshing with a toothed rack on said slidable bar.

* * * * *